Jan. 22, 1952     R. L. MOONSHOWER     2,583,151
GARDEN HOSE REEL ASSEMBLY
Filed July 30, 1949
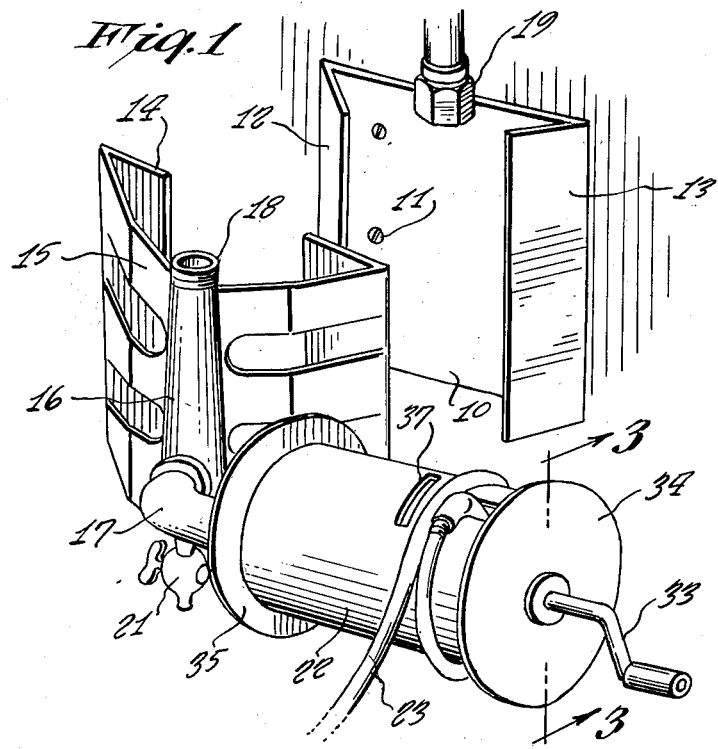
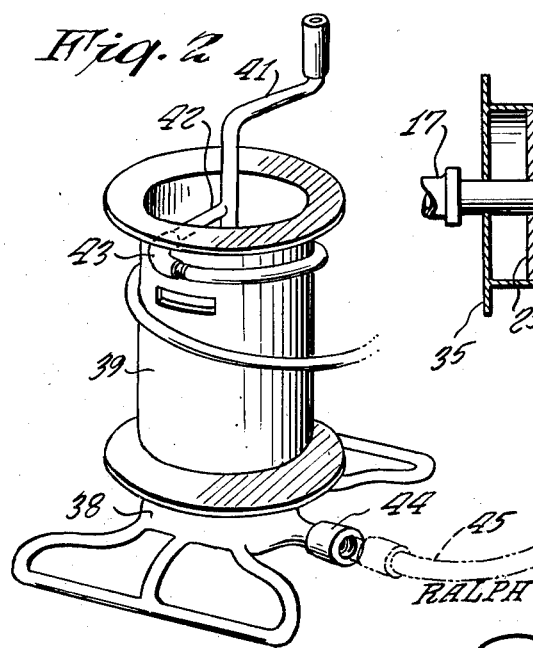
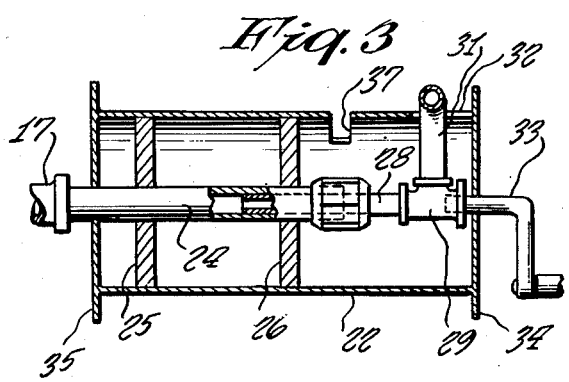
INVENTOR.
RALPH LEROY MOONSHOWER
BY
Carl Miller
ATTORNEY Patented Jan. 22, 1952

2,583,151

UNITED STATES PATENT OFFICE 2,583,151

GARDEN HOSE REEL ASSEMBLY

Ralph Leroy Moonshower, Huntington, Ind.

Application July 30, 1949, Serial No. 107,757

1 Claim. (Cl. 299—78)

This invention relates to a garden hose reel assembly.

It is an object of the present invention to provide a hose reel assembly wherein the hose can be carried upon a reel and connected as a unit to a water supply pipe and wherein this assembly can be attached to a building wall in a releasable manner.

Other objects of the present invention are to provide a hose reel assembly which is of simple construction, inexpensive to manufacture, easy to handle, compact, has a minimum number of parts, sturdy, convenient to use and efficient in operation.

For other objects and for a better understanding of the invention, reference may be had to the following detailed description taken in connection with the accompanying drawing, in which Fig. 1 is a perspective view of a garden hose assembly having a bracket adapted to be releasably connected to an attaching plate on the side of a building.

Fig. 2 is a perspective view of a modified form of the invention wherein the wheel is mounted upon a ground support.

Fig. 3 is a transverse sectional view taken on line 3—3 of Fig. 1.

Referring now to the figures, 10 represents an attaching plate adapted to be connected to a wall surface by screws 11. This attaching plate has inwardly bent side portions 12 and 13. These side portions are adapted to receive inwardly bent ends 14 of a bracket member 15 as the bracket member 15 is lowered into the attaching plate 10. This bracket member contains a fitting 16 to which an elbow 17 is connected for receiving water therefrom. The fitting 16 is threaded, as indicated at 18, to receive a hose coupling 19 for the supplying of water to the fitting. A pet cock 21 is mounted on the lower end of the fitting to effect the draining of water from the hose which is provided upon a reel 22, as indicated at 23. A pipe 24 extends inwardly from the elbow 17, Fig. 3, and this pipe serves as the support for reel 22. Within the reel are apertured spaced plates 25 and 26 which receive the pipe 24. On this pipe is a coupling 27 which receives a pipe 28 having a T fitting 29 for delivering water to an elbow 31 to which hose 23 is attached. This elbow 31 extends through a slot 32 in the reel 22. A crank 33 is connected to the T fitting 29 to effect the turning of the member 31 and the hose 23 upon the reel 22.

The reel has end flanges 34 and 35. The reel 22 also has a slot 37 through which access can be had to the coupling 27.

With the attaching bracket 15 mounted in the plate 10, the reel will be supported upon the side of the building and when it is desired to draw the hose inwardly upon the reel crank 33 is turned.

While one support structure has been provided, it will be apparent that a different supporting structure can be provided as shown in Fig. 2, and there is a base 38 on which a reel 39 is journalled for rotation about a vertical axis. This reel 39 is constructed similar to the reel 22, but is open at its upper end and crank 41 thereof is a part of the pipe for delivering water to an arm 42 thereof which extends outwardly through the reel and has a bent portion 43. The base 38 has an inlet projection 44 to which a supply hose 45 is attached.

While various changes may be made in the detail construction, it shall be understood that such changes shall be within the spirit and scope of the present invention as defined by the appended claim.

Having thus set forth and disclosed the nature of my invention, what is claimed is:

A hose reel assembly comprising an attaching plate adapted to be secured to a vertical wall surface, said attaching plate having inwardly extending wing portions, a bracket having portions adapted to fit the inwardly extending wing portions of the attaching plate to be releasably secured thereto, a water receiving fitting connected to the bracket and adapted to have a water supply hose connected thereto, an elbow extending from the water receiving fitting, a hollow shaft connected to the elbow for receiving water, crank means connected to said shaft and having an outwardly extending water delivery pipe arm, a reel journalled on said shaft, said pipe arm extending radially through the reel and to the exterior thereof and in driving relationship therewith and releasable coupling means between the shaft and the axle portion of the crank means to permit the rotation of the crank means and the reel relative to the shaft, said axle portion of the crank means being hollow and in water supply connection with the pipe arm.

RALPH LEROY MOONSHOWER.

REFERENCES CITED

The following references are of record in the file of this patent:

UNITED STATES PATENTS

| Number | Name | Date |
|---|---|---|
| 775,931 | Ott | Nov. 29, 1904 |
| 988,766 | Frigon | Apr. 4, 1911 |
| 990,453 | Newton | Apr. 25, 1911 |
| 1,350,499 | Hamner | Aug. 24, 1920 |
| 1,441,157 | Krenke | Jan. 2, 1923 |
| 1,886,207 | Marshall et al. | Nov. 1, 1932 |